(12) United States Patent
Toshev et al.

(10) Patent No.: US 8,467,607 B1
(45) Date of Patent: Jun. 18, 2013

(54) SEGMENTATION-BASED FEATURE POOLING FOR OBJECT MODELS

(75) Inventors: Alexander T. Toshev, San Francisco, CA (US); Jay Yagnik, Santa Clara, CA (US); Vivek Kwatra, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 30 days.

(21) Appl. No.: 13/301,621

(22) Filed: Nov. 21, 2011

(51) Int. Cl.
*G06T 7/0081* (2006.01)
(52) U.S. Cl.
USPC ............................ 382/173; 382/178; 382/199
(58) Field of Classification Search
USPC ................. 382/173, 149, 199, 162, 186, 178, 382/224; 707/694, 755, 999.004; 358/1.15, 358/1.13; 715/230; 1/1
See application file for complete search history.

(56) References Cited

U.S. PATENT DOCUMENTS

| 6,941,016 B1 * | 9/2005 | Wagman et al. | ............. 382/199 |
| 7,698,340 B2 * | 4/2010 | Ye et al. | ........................ 707/755 |

* cited by examiner

*Primary Examiner* — Anh Do
(74) *Attorney, Agent, or Firm* — Lowenstein Sandler LLP (57) ABSTRACT

Methods and systems for processing an image to create an object model are disclosed. In accordance with one embodiment, each segment of the image is assigned to a respective bin of a bounding box. For each bin of the bounding box, the value of a feature for the bin is computed based on the values of that feature for each of the segments assigned to the bin. An object model is then created based on the values of the feature for the bin.

20 Claims, 6 Drawing Sheets

SEGMENTATION-BASED FEATURE POOLING FOR OBJECT MODELS

TECHNICAL FIELD

Embodiments of the present invention relate to data processing, and more specifically, to image processing.

BACKGROUND

A digital image is generally a representation of a real image (e.g., a photograph) in a format which may be processed by a computer system. A digital image generally comprises a plurality of picture elements (e.g., pixels) arranged in a two-dimensional array. Each pixel may have a color and/or a color value associated with the pixel. Information associated with the location and color of each pixel may be stored and/or used by a computer system to display the digital image.

Object detection is the task of ascertaining that a set of pixels in an image is associated with a particular object. Object recognition is the task of identifying what the object is (e.g., a car, a tree, etc.). Although humans can detect and recognize objects in images with little effort, these tasks are particularly challenging for computer systems. There are multiple techniques for performing object detection and object recognition. However, current object detection and object recognition techniques still fail to accurately detect and recognize objects in many instances.

SUMMARY

In an embodiment of the present invention, a computer system assigns each of a plurality of segments of an image to a respective bin of a bounding box for the image. The computer system determines a value of a feature for each of the segments, and then determines a value of the feature for each bin of the bounding box, where the value of the feature for the bin is based on the values of the feature for the segments assigned to the bin. The computer system then creates an object model for the image based on the values of the feature for the bins of the bounding box.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Methods and systems for processing an image to create an object model are described. In an embodiment of the present invention, a computing device employs both a segmentation of an image and a bounding box for the image. In segmentation, an image is partitioned into a set of regions called segments that consist of pixels with similar features (e.g., color, texture, intensity, etc.). The segments are characterized by the fact that they can be of any size and shape, depending on the pixels of the image.

In one embodiment, a bounding box is partitioned spatially into a plurality of regions (e.g., rectangular cells, etc.), each of which can be considered to be a spatial bin, and each of the segments of the image is assigned to a respective bin of the bounding box. In accordance with one such embodiment, the assignment of segments to bins is based on the spatial overlap of each segment with each bin of the bounding box.

For each bin of the bounding box, the value of a feature (e.g., color intensity, number of edges, etc.) for the bin is computed based on the values of that feature for each of the segments assigned to the bin, a technique referred to herein as feature pooling. The pooling of features in this manner combines the desirable aspects of segmentation-based techniques (e.g., more precise support for object detection, etc.) with the desirable aspects of bounding box techniques (e.g., stability, repeatability, etc.). An object model can then be created based on the pooled features to provide support for object detection and recognition algorithms.

Moreover, while segmentation algorithms tend to be unstable and often partition the same objects in different ways, the produced segments tend to respect object boundaries. Consequently, when computing the features for each bounding box bin using the underlying segments, one would more likely consider segments, and thus features, which belong to the object and respect interior object contours. This typically results in feature representations that are both cleaner and more stable.

Note that embodiments of the present invention are described with reference to images. However, embodiments of the present invention also apply to videos. For example, embodiments of the present invention may perform object detection and object recognition for frames of a video. Alternatively, embodiments of the present invention may combine estimates over multiple frames to perform object detection and recognition.

Note also that embodiments of the present invention are described with reference to bounding boxes. A bounding box is a rectangle that is partitioned spatially into a plurality of regions (e.g., rectangular cells, etc.), each of which can be considered to be a spatial bin. A bounding box is one type of geometric configuration model. It should be understood that embodiments of the present invention may also be used to determine other types of geometric configuration models, such as constellations, k-fans, and so forth. Additionally, embodiments of the present invention are discussed with reference to image segmentation. However, alternative embodiments may perform other types of perceptual grouping, such as contour detection.

Figure 1:
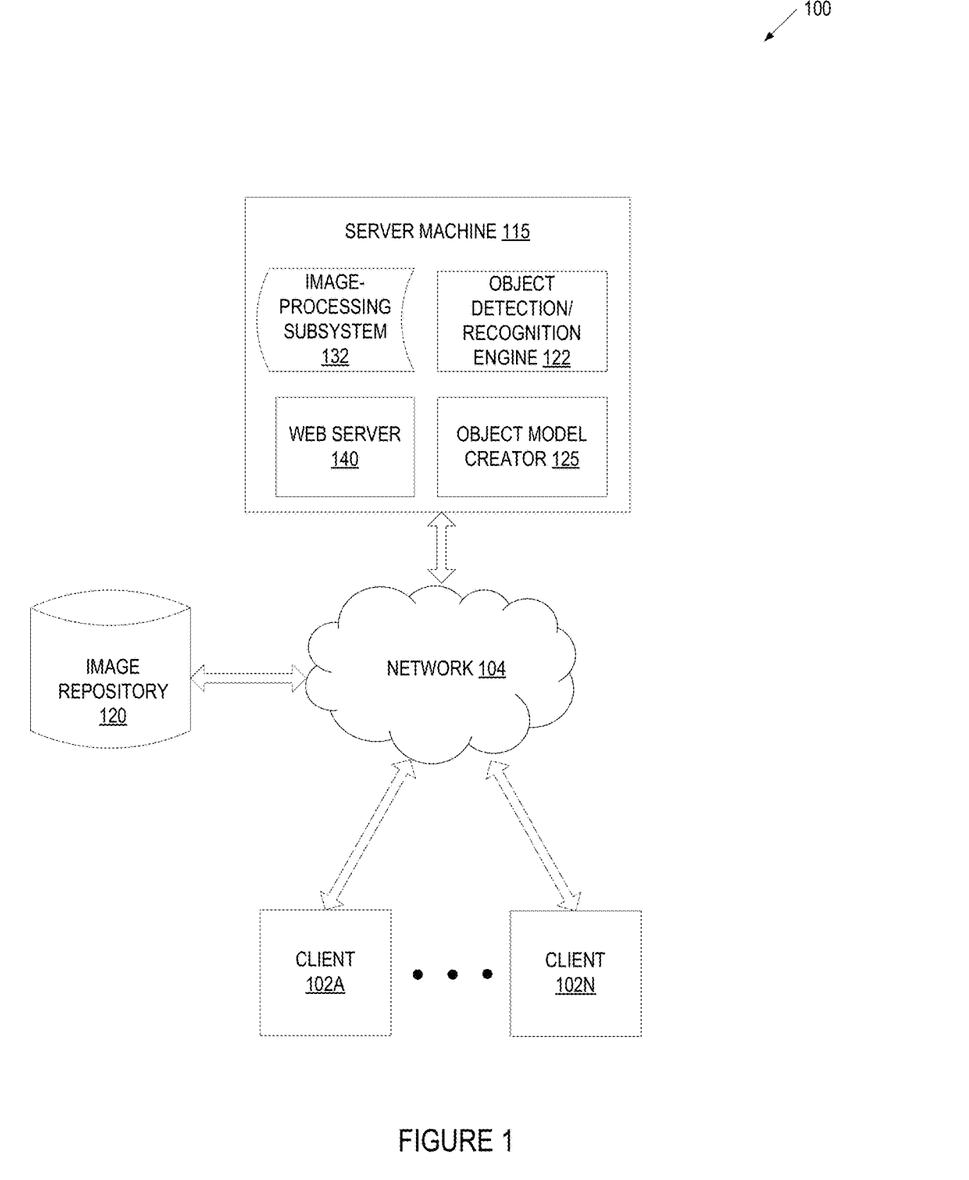
FIG. 1 illustrates an exemplary system architecture, in accordance with one embodiment of the present invention.

FIG. 1 illustrates an example system architecture 100, in accordance with one embodiment of the present invention. The system architecture 100 includes a server machine 115, an image repository 120 and client machines 102A-102N connected to a network 104. Network 104 may be a public network (e.g., the Internet), a private network (e.g., a local area network (LAN) or wide area network (WAN)), or a combination thereof.

The client machines 102A-102N may be personal computers (PC), laptops, mobile phones, tablet computers, or any other computing devices. The client machines 102A-102N may run an operating system (OS) that manages hardware and software of the client machines 102A-102N. A browser (not shown) may run on the client machines (e.g., on the OS of the client machines). The browser may be a web browser that can access content served by a web server. The browser may issue image search queries to the web server or may browse images and/or videos that have previously been classified. The client machines 102A-102N may also upload images to the web server for storage and/or classification.

Server machine 115 may be a rackmount server, a router computer, a personal computer, a portable digital assistant, a mobile phone, a laptop computer, a tablet computer, a camera, a video camera, a netbook, a desktop computer, a media center, or any combination of the above. Server machine 115 includes a web server 140, an image-processing subsystem 132, an object detection/recognition engine 122, and an object model creator 125. In alternative embodiments, the web server 140, object detection/recognition engine 122 and/or object model creator 125 may run on different machines. Additionally, in some embodiments, the object detection/recognition engine 122 and object model creator 125 may be combined into a single module.

Image repository 120 is a persistent storage that is capable of storing images and/or video. In some embodiments image repository 120 might be a network-attached file server, while in other embodiments image repository 120 might be some other type of persistent storage such as an object-oriented database, a relational database, and so forth, that may be hosted by the server machine 115 or one or more different machines coupled to the server machine 115 via the network 104. The images and video stored in the image repository 120 may include user-generated content that is uploaded by client machines. The images and video may additionally or alternatively include content provided by service providers such as news organizations, publishers, libraries and so on.

Web server 140 may serve images from image repository 120 to clients 102A-102N. Web server 140 may receive image search queries and perform searches on the images in the image repository 120 to determine images that satisfy the image search query. Web server 140 may then send to a client 102A-102N those images that match the search query.

In order for the image repository 120 to be searchable, the images in the image repository 120 may be classified. In one embodiment, object detection/recognition engine 122 classifies the images 126 in the image repository 120. Classifying the images may include performing object detection on the images (identifying the locations of objects in the images) as well as performing object recognition on the objects (determining object classes for those detected objects). The images may then be classified based on the objects that the images contain.

In accordance with one embodiment, image-processing subsystem 132 segments an image. A segment may be a region that consists of pixels with similar features (e.g., color, texture, intensity, etc.). The image-processing subsystem 132 predicts bounding boxes in the images, and assigns each segment of the image to a respective bin of a bounding box. The image-processing subsystem 132 then computes the value of a feature for each of the segments, and pools the features by computing, for each bin in the bounding box, a value of the feature based on the values of that feature for each of the segments assigned to the bin. An embodiment of image-processing subsystem 132 is described in detail below and with respect to FIGS. 2 through 5.

Object model creator 125 is capable of creating one or more models of one or more objects in the image based on the processing performed by image-processing subsystem 132. Object model creator 125 may use any combination of one or more techniques for creating an object model. For example, in some embodiments, object model creator 125 may "learn" an object model from labeled training data, where the objects of interest in each image in the training data have a manually-selected bounding box. For each such label object, one can extract a representation as described above. This representation can be used to train any standard classifier, such as a Support Vector Machine (SVM), AdaBoost, etc. to obtain a model.

Object detection/recognition engine 122 is capable of detecting and recognizing objects in the image based on the object models. Examples of an object include a car, a tree, a person, a face, a building, and so forth. Object detection/recognition engine 122 may use any combination of one or more techniques for performing object detection, such as techniques that employ a histogram of oriented gradients (HOG), or part-models such as k-fans, constellation models, pictorial structure, and so forth.

Additionally, object detection/recognition engine 122 may use any combination of one or more techniques for performing object recognition, such as computer aided design (CAD)-like approaches (e.g., Marr, Mohan and Nevatia, Lowe, Faugeras, etc.), recognition by parts (e.g., Binford, Biederman, Dickinson, Forsyth and Ponce, etc.), appearance-based methods (e.g., edge matching, divide-and-conquer search, grayscale matching, gradient matching, etc.), feature-based techniques (e.g., such as interpretation trees, hypothesize and test, pose consistency, pose clustering, invariance, geometric hashing, scale-invariant feature transform [SIFT], speeded-up robust features [SURF], etc.), and so forth.

Figure 2:
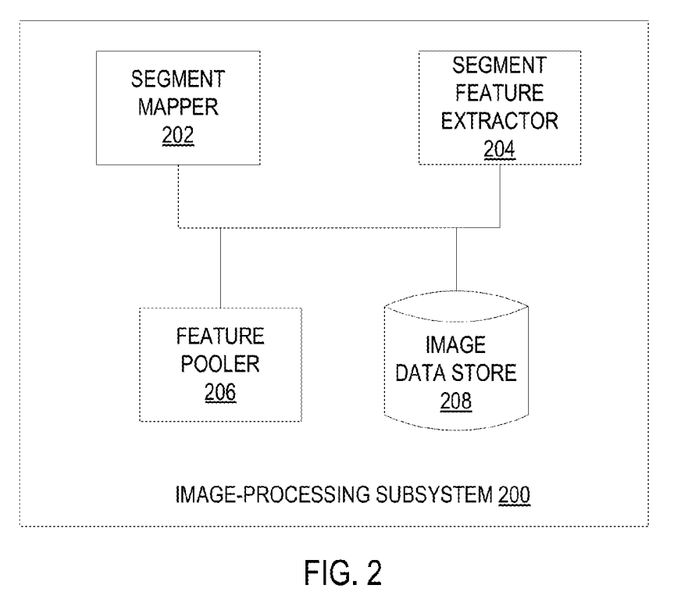
FIG. 2 is a block diagram of one embodiment of an image-processing subsystem.

FIG. 2 is a block diagram of one embodiment of an image-processing subsystem 200. The image-processing subsystem 200 may be the same as the image-processing subsystem 132 of FIG. 1 and may include a segment mapper 202, a segment feature extractor 204, a feature pooler 206, and an image data store 208. The components can be combined together or separated in further components, according to a particular embodiment.

The image data store 208 may be a temporary buffer or a permanent data store to hold an image that is to be processed. Alternatively, image data store 208 may be hosted by one or more storage devices, such as main memory, magnetic or optical storage based disks, tapes or hard drives, NAS, SAN, and so forth.

The segment mapper 202 segments an image and assigns each segment of the image to a respective bin of a bounding box in the image. A segment as referred to herein is a region that consists of pixels with similar features. A feature may pertain to color, and may reflect color variation within a region. For example, a region of homogeneous color will remain distinct from a region having pixels of a different color. A feature may also pertain to other properties such as intensity, texture, etc. A segment may include identifying information such as the position of the segment within an image (e.g., using "x" and "y" axes), the size and/or geometric shape of the segment, a color value (or multiple color values) associated with the segment, an intensity of the segment, a texture of the segment, and so on. In one embodiment, segments are represented as a vector with a color, a texture and/or additional image properties.

Segment mapper 202 may use any combination of one or more techniques for partitioning the image into segments, such as thresholding techniques, clustering techniques (e.g., connectivity-based techniques such as hierarchical clustering, centroid-based techniques such as the k-means algorithm, distribution techniques such as multivariate normal distributions, density-based techniques, subspace-based techniques such as biclustering, etc.), compression-based techniques, histogram-based techniques, region growing techniques, split-and-merge techniques, partial differential equations (PDE) techniques, graph partitioning techniques, watershed transformation techniques, model-based techniques, multi-scale techniques (e.g., Witkin, Koenderink, Lifshitz and Pizer, Lindeberg, etc.), semi-automatic techniques (e.g., SIOX, Livewire, Intelligent Scissors, IT-SNAPS, etc.), and so forth.

The segment mapper 202 assigns each segment of the image to a respective bin of a bounding box in the image based on the overlapping of segments with bins of the bounding box. The size and position of the bounding box may be determined in any one of a number of ways. For example, in some embodiments the size of the bounding box for a particular object type might be determined during training based on manually-labeled bounding boxes of objects. In such embodiments, for each model one can exhaustively try all possible locations and scales within an input image. One embodiment of a mechanism for assigning segments to bins is described in more detail below with respect to FIGS. 3 and 5.

The segment feature extractor 204 determines a value of a particular feature for each segment. Segment feature extractor 204 may use any combination of one or more techniques for extracting feature values from the segments in the image, such as principal components analysis, semidefinite embedding, multifactor dimensionality reduction, nonlinear dimensionality reduction, Isomap-based techniques, partial least squares, independent component analysis, and so forth.

The feature pooler 206 determines the value of the particular feature for each bin of the bounding box. In particular, for each bin of the bounding box, the value of a feature for the bin is determined based on the values of that feature for the segments assigned to the bin. In some embodiments, the value of the feature for the bin might be determined via one or more computations, while in some other embodiments the value of the feature for the bin might be determined in some other fashion (e.g., constructing a vector comprising some or all of the individual segment feature values, etc.). An embodiment of feature pooling is described in more detail below with respect to FIG. 5.

Figure 3:
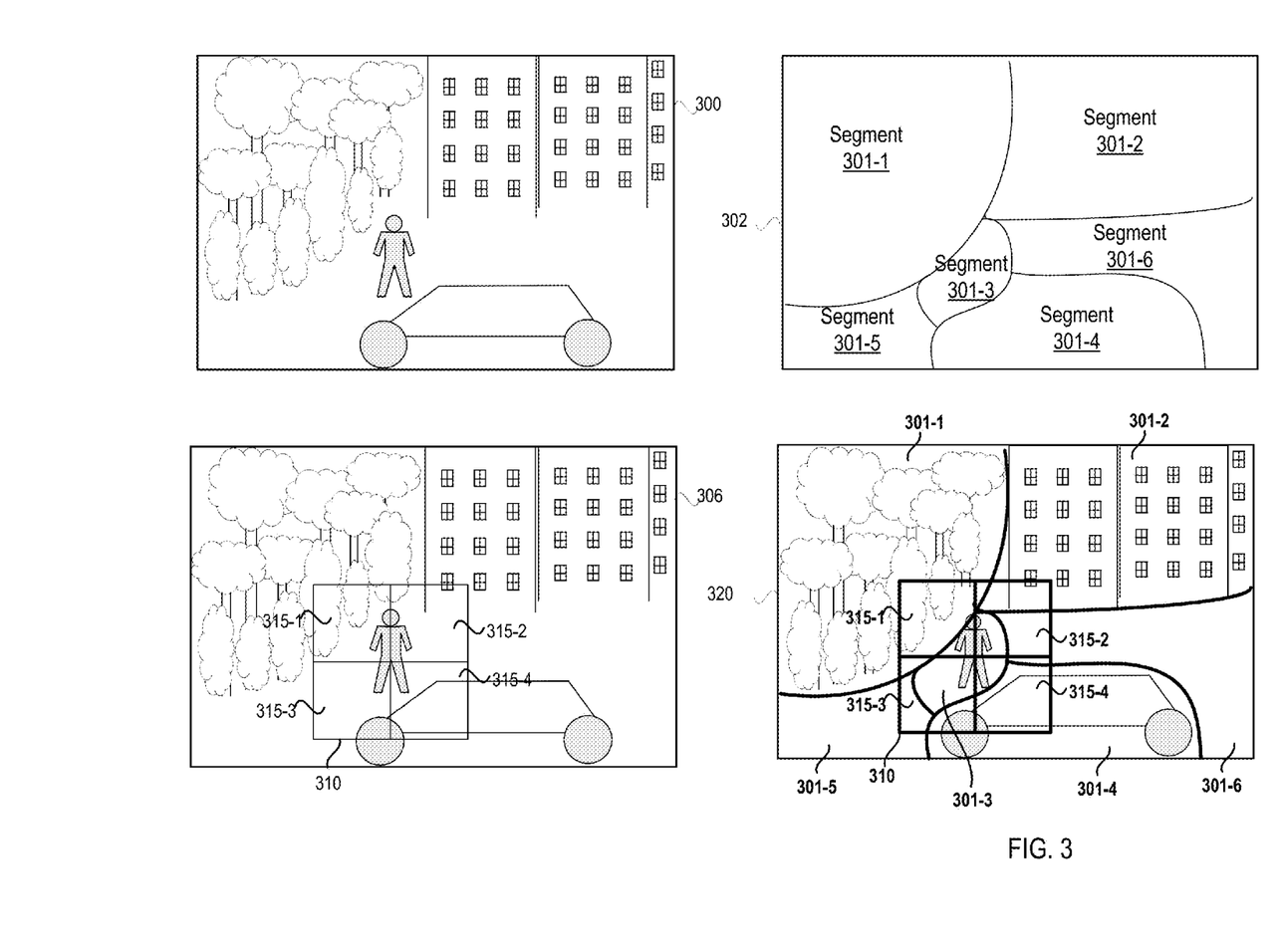
FIG. 3 illustrates a mechanism for assigning image segments to bins of a bounding box in accordance with some embodiments of the invention.

FIG. 3 illustrates a mechanism for assigning image segments to bins of a bounding box in accordance with some embodiments of the invention. Block 300 depicts an illustrative image 300 having several objects (e.g., a car, a person, etc.). Block 302 illustrates segmentation of image 300 into six segments 301-1 through 301-6, arranged as shown. Block 306 depicts illustrative bounding box 310 centered on the person in image 300, in accordance with an embodiment of the invention. The size and position of bounding box 310 may be determined in any one of a number of ways. For example, in some embodiments the size of the bounding box for a particular object type might be determined during training based on manually-labeled bounding boxes of objects. In such embodiments, for each model one can exhaustively try all possible locations and scales within an input image. As shown, illustrative bounding box 310 is divided into four square-shaped bins 315-1 through 315-4. It should be noted that the number of bins in bounding box 310 is merely illustrative, and bounding boxes can have an arbitrary number of bins. It should also be noted that some other bounding boxes might comprise bins of another shape (e.g., rectangular, etc.) rather than square-shaped bins, or might comprise bins that are not uniformly sized, or both.

Block 320 depicts the illustrative segmentation of illustrative image 300 in combination with illustrative bounding box 310, in accordance with an embodiment of the invention. As shown, each of segments 301-1 through 301-6 overlaps with at least one of bins 315-1 through 315-4. Alternatively, for some other combinations of image, segmentation, and bounding box this might not necessarily be the case; for example, if a bounding box is wholly contained within a single segment, then none of the other segments of the image will overlap any bins of the bounding box. It should be noted that in some embodiments, such as in block 320, the result of combining the segmentation with the bounding box can be considered a bounding box in which the bins are arranged as a deformable grid.

Figure 4:
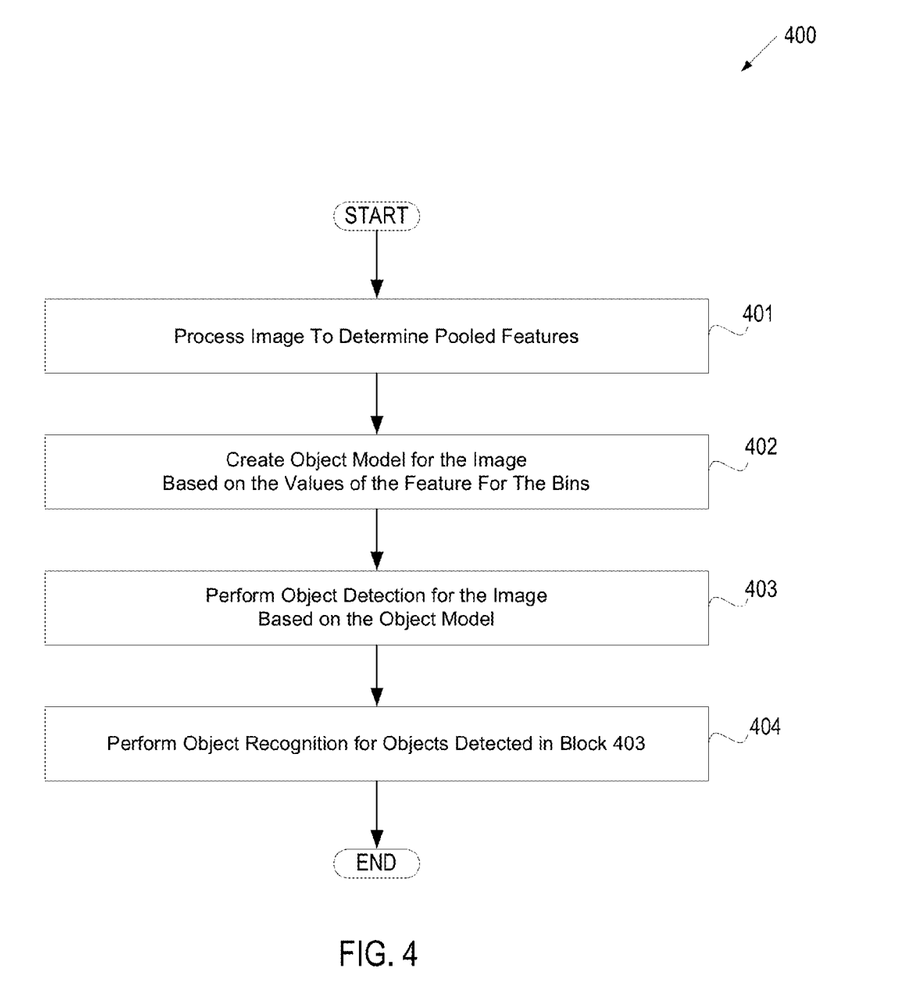
FIG. 4 depicts a flow diagram of one embodiment of a method for recognizing one or more objects in an image.

FIG. 4 depicts a flow diagram of one embodiment of a method 400 for recognizing one or more objects in an image. The method is performed by processing logic that may comprise hardware (circuitry, dedicated logic, etc.), software (such as is run on a general purpose computer system or a dedicated machine), or a combination of both. In one embodiment, the method is performed by the server machine 115 of FIG. 1, while in some other embodiments, one or more of blocks 401 through 404 might be performed by another machine. It should be noted that in some embodiments, the image-processing subsystem 132, object detection/recognition engine 122, and the object model creator 125 may run on separate machines. It should also be noted that blocks depicted in FIG. 4 can be performed simultaneously or in a different order than that depicted.

At block 401, an image is processed to determine pooled features. An embodiment of block 401 is described in more detail below and with respect to FIG. 5. In accordance with one embodiment, block 401 is performed by image-processing subsystem 132.

At block 402, an object model is created based on the values of feature f for the bins of the bounding box (i.e., the pooled features). For example, the object model may be created by learning an object model from labeled training data, where the objects of interest in each image in the training data have a manually-selected bounding box. For each such label object, one can extract a representation as described above. This representation can be used to train any standard classifier, such as a Support Vector Machine (SVM), AdaBoost, etc. to obtain a model. Due to the fixed geometry of the bounding box and its bins, the object model can be stored in memory using a fixed-size vector.

At block 403, a method of object detection is performed for the image based on the object model created at block 402. For example, object detection may be performed using a histogram of oriented gradients (HOG), or part-models such as k-fans, constellation models, pictorial structure, and so forth.

At block 404, a method of object recognition is performed for the objects detected at block 403. For example, object recognition may be performed via computer aided design (CAD)-like techniques, such as those of Man, Mohan and Nevatia, Lowe, Faugeras, etc.; recognition by parts techniques, such as those of Binford, Biederman, Dickinson, Forsyth and Ponce, etc.; appearance-based techniques, such as edge matching, divide-and-conquer search, grayscale matching, gradient matching, etc.; feature-based techniques, such as interpretation trees, hypothesize and test, pose consistency, pose clustering, invariance, geometric hashing, scale-invariant feature transform (SIFT), speeded-up robust features (SURF), etc.; and so forth.

Figure 5:
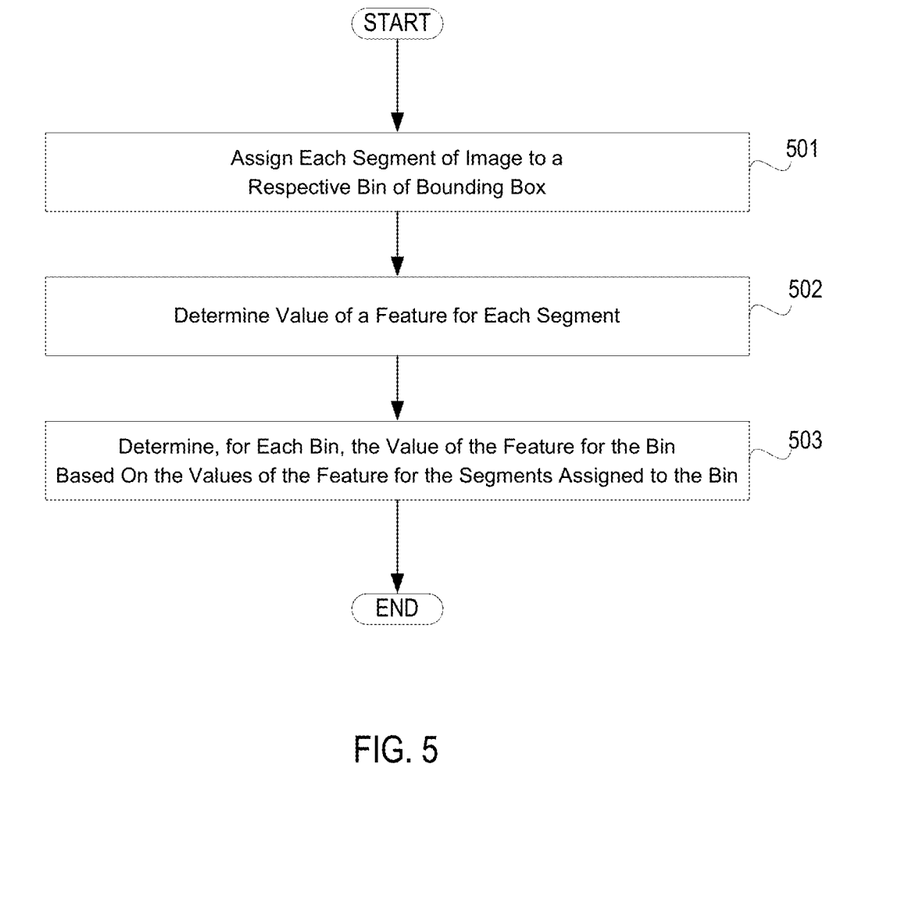
FIG. 5 depicts a flow diagram of one embodiment of a method for processing an image to determine pooled features.

FIG. 5 depicts a flow diagram of one embodiment of a method for processing an image to determine pooled features. It should be noted that blocks depicted in FIG. 5 can be performed simultaneously or in a different order than that depicted.

At block 501, each segment of an image is assigned to a respective bin of a bounding box for the image. In accordance with one embodiment, a segment is assigned to a bin with which the segment maximally overlaps. For example, as shown in FIG. 3D, segment 301-1 maximally overlaps bin 315-1 (i.e., the area of intersection of segment 301-1 with bin 315-1 is greater than the area of intersection of segment 301-1 with any of the other bins), and therefore in accordance with one embodiment, segment 301-1 is assigned to bin 315-1. Similarly, in accordance with this embodiment, segment 301-2 is assigned to bin 315-2, segment 301-3 is assigned to bin 315-3, segment 301-4 is assigned to bin 315-4, segment 301-5 is assigned to bin 315-3, and segment 301-6 is assigned to bin 315-2. Table 1 below summarizes these assignments, ordered by bins.

TABLE 1

Assignment of Segments to Bins

| Bin | Segment(s) |
| --- | --- |
| 315-1 | 301-1 |
| 315-2 | 301-2, 301-6 |
| 315-3 | 301-3, 301-5 |
| 315-4 | 301-4 |

At block 502, the value of a feature f (e.g., color, intensity, texture, etc.) is determined for each segment of the image. Expressed in mathematical notation, let $S=\{s_1, \ldots, s_m\}$ denote the set of segments of the image, where m is a positive integer, and let $f_i$ denote the value of feature f for segment $s_i$, where i is an integer and $1 \leq i \leq m$.

Feature values for segments may be determined using principal components analysis, semidefinite embedding, multifactor dimensionality reduction, nonlinear dimensionality reduction, Isomap-based techniques, partial least squares, independent component analysis, and so forth. In some embodiments the actual computations associated with determining feature values might be performed at block 502, while in some other embodiments these computations might be performed by some other entity (e.g., an executable library of image processing routines [not depicted in FIG. 1] hosted by server machine 115, etc.) and the results provided to image-processing subsystem 132.

At block 503, for each bin of the bounding box, the value of feature f for the bin is determined based on the values of feature f for the segments assigned to the bin. In some embodiments, the value of feature f for the bin might be determined via one or more computations, while in some other embodiments the value of feature f for the bin might be determined in some other fashion (e.g., constructing a vector comprising some or all of the individual segment feature values, etc.).

In accordance with one embodiment, the value of feature f for the bin is computed by applying a function to the segment feature values. In particular, let:

$\{b_1, \ldots, b_n\}$ denote the set of bins of the bounding box, where n is a positive integer;

$f_{b\_k}$ denote the value of feature f for bin $b_k$, where k is an integer and $1 \leq k \leq n$; and $\{s_{k\_1}, \ldots, s_{k\_r}\} \subset S$ denote the segments assigned to bin $b_k$, where r is an integer and $1 \leq r \leq m$.

Then the computation at block 403 for each bin $b_k$ can be expressed as:

$$f_{b\_k} = H(\{s_{k\_1}, \ldots, s_{k\_r}\}) \quad \text{(Eq. 1)}$$

where H is a function.

In one such embodiment H is a summation:

$$H(\{s_{k\_1}, \ldots, s_{k\_r}\}) = \sum_{j=1}^{r} f_{k\_j} \quad \text{(Eq. 2)}$$

while in some other such embodiments, another type of function H might be employed (for example, the maximum of the $f_{k\_1}$ through $f_{k\_r}$, a statistical estimator of $f_{k\_1}$ through $f_{k\_r}$ [e.g., mean, median, a percentile, etc.], and so forth).

In some embodiments, a histogram of oriented gradients (HOG) is used in combination with a bounding box for object detection. In addition, some embodiments might employ another type of geometric-configuration model in lieu of a bounding box (e.g., a constellation, a k-fan, etc.).

Figure 6:
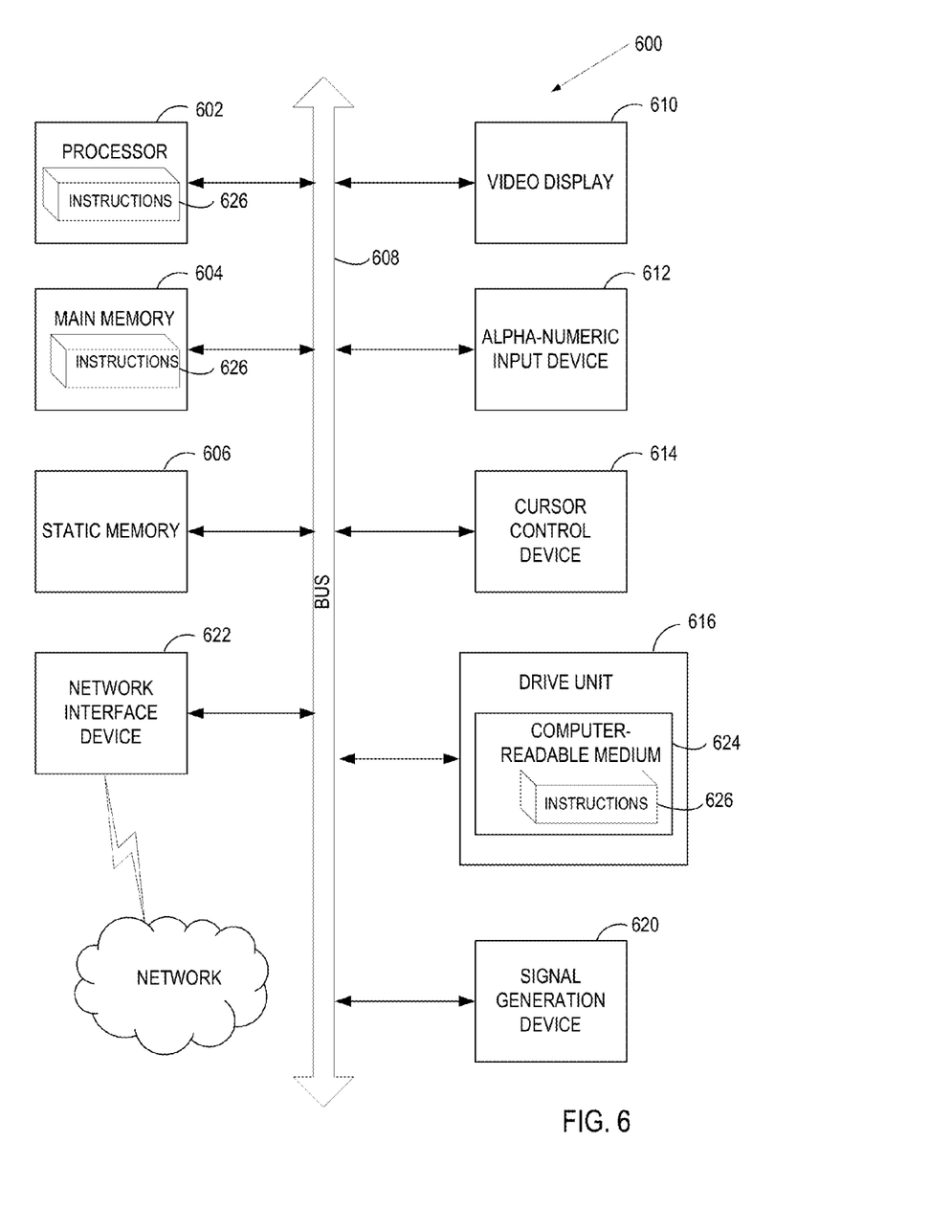
FIG. 6 depicts a block diagram of an illustrative computer system operating in accordance with embodiments of the invention.

FIG. 6 illustrates an exemplary computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 606.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions executed by image-processing subsystem 132 and corresponding to blocks 501 through 503, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network 620 via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "representing," "assigning," "determining," "computing," "creating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   assigning, by a computer system, each of a plurality of segments of an image to a respective bin of a bounding box for the image, wherein the bounding box comprises a plurality of bins;
   determining, by the computer system, a value of a feature for each of the plurality of segments;
   determining by the computer system, for each bin of the bounding box, a value of the feature for the bin, wherein the value of the feature for the bin is based on values of the feature for the segments assigned to the bin; and
   creating an object model for the image based on the values of the feature for the bins.

2. The method of claim 1 wherein a segment is assigned to a bin that the segment maximally overlaps.

3. The method of claim 1 wherein the determining of the value of the feature for the bin comprises applying a function to the values of the feature for the segments assigned to the bin.

4. The method of claim 3 wherein the function is a summation.

5. The method of claim 3 wherein the function is the maximum of the values of the feature for the segments assigned to the bin.

6. The method of claim 1 further comprising storing the object model in a fixed-sized vector in memory.

7. The method of claim 1 wherein the bins of the bounding box are arranged as a deformable grid.

8. An apparatus comprising:
   a memory to store an image; and a processor, coupled to the memory, to:
- assign each of a plurality of segments of an image to a respective bin of a bounding box for the image, wherein the bounding box comprises a plurality of bins;
- determine a value of a feature for each of the plurality of segments;
- determine, for each bin of the bounding box, a value of the feature for the bin, wherein the value of the feature for the bin is based on values of the feature for the segments assigned to the bin; and
- create an object model for the image based on the values of the feature for the bins.

9. The apparatus of claim 8 wherein a segment is assigned to a bin that the segment maximally overlaps.

10. The apparatus of claim 8 wherein determining the value of the feature for the bin comprises applying a function to the values of the feature for the segments assigned to the bin.

11. The apparatus of claim 10 wherein the function is a summation.

12. The apparatus of claim 10 wherein the function is a statistical estimator of the values of the feature for the segments assigned to the bin.

13. The apparatus of claim 8 wherein the memory is also to store the object model in a fixed-sized vector.

14. The apparatus of claim 8 wherein the bins of the bounding box are arranged as a deformable grid.

15. A non-transitory computer-readable storage medium, having instructions stored therein, which when executed, cause a computer system to perform a method comprising:
- assigning, by the computer system, each of a plurality of segments of an image to a respective bin of a bounding box for the image, wherein the bounding box comprises a plurality of bins;
- determining a value of a feature for each of the plurality of segments;
- determining, for each bin of the bounding box, a value of the feature for the bin, wherein the value of the feature for the bin is based on values of the feature for the segments assigned to the bin; and
- creating an object model for the image based on the values of the feature for the bins.

16. The non-transitory computer-readable storage medium of claim 15 wherein a segment is assigned to a bin that the segment maximally overlaps.

17. The non-transitory computer-readable storage medium of claim 15 wherein the determining of the value of the feature for the bin comprises applying a function to the values of the feature for the segments assigned to the bin.

18. The non-transitory computer-readable storage medium of claim 17 wherein the function is a summation.

19. The non-transitory computer-readable storage medium of claim 17 wherein the function is the maximum of the values of the feature for the segments assigned to the bin.

20. The non-transitory computer-readable storage medium of claim 15 wherein the method further comprises storing the object model in a fixed-sized vector in memory.

* * * * *